(12) United States Patent
Hur et al.

(10) Patent No.: US 11,567,663 B2
(45) Date of Patent: Jan. 31, 2023

(54) STORAGE DEVICE AND HOST FOR THE SAME

(71) Applicant: SAMSUNG ELECTRONICS CO., LTD., Suwon-si (KR)

(72) Inventors: Jeong Hur, Hwaseong-si (KR); Jae-Gyu Lee, Suwon-si (KR); Young-Moon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/221,503

(22) Filed: Apr. 2, 2021

(65) Prior Publication Data

US 2021/0223961 A1 Jul. 22, 2021

Related U.S. Application Data

(63) Continuation of application No. 15/690,849, filed on Aug. 30, 2017, now Pat. No. 10,969,960.

(60) Provisional application No. 62/382,393, filed on Sep. 1, 2016.

(30) Foreign Application Priority Data

Feb. 7, 2017 (KR) .................. 10-2017-0016850

(51) Int. Cl.
*G06F 12/00* (2006.01)
*G06F 3/06* (2006.01)

(52) U.S. Cl.
CPC .......... *G06F 3/0607* (2013.01); *G06F 3/0632* (2013.01); *G06F 3/0655* (2013.01); *G06F 3/0679* (2013.01); *G06F 3/0688* (2013.01)

(58) Field of Classification Search
CPC .... G06F 3/0607; G06F 3/0632; G06F 3/0655; G06F 3/0679; G06F 3/0688
See application file for complete search history.

(56) References Cited

U.S. PATENT DOCUMENTS

| | | | |
|---|---|---|---|
| 8,843,680 B2 | 9/2014 | Mimata et al. | |
| 9,128,615 B2 | 9/2015 | Benisty et al. | |
| 9,189,163 B2 | 11/2015 | Bhuiyan | |
| 9,395,919 B1 | 7/2016 | Chu | |
| 2004/0204778 A1 | 10/2004 | Lalapeth et al. | |
| 2004/0225926 A1* | 11/2004 | Scales .................. | G06F 3/0632 714/E11.206 |

(Continued)

FOREIGN PATENT DOCUMENTS

| | | |
|---|---|---|
| KR | 1020150014002 | 2/2015 |
| KR | 1020150120213 | 10/2015 |
| KR | 1020160016485 | 2/2016 |

OTHER PUBLICATIONS

Office Action dated Jul. 10, 2019 in Corresponding U.S. Appl. No. 15/690,849.

(Continued)

*Primary Examiner* — Gurtej Bansal
(74) *Attorney, Agent, or Firm* — F. Chau & Associates, LLC

(57) ABSTRACT

A storage device includes a storage device communicably connected to a host; a nonvolatile memory configured to store calibration data of the host; and a calibration circuit configured to receive a descriptor from the host including the setting information and update the calibration data with the received setting information.

8 Claims, 18 Drawing Sheets

(56) References Cited

U.S. PATENT DOCUMENTS

| | | |
|---|---|---|
| 2006/0026525 A1 | 2/2006 | Fischer et al. |
| 2007/0055854 A1* | 3/2007 | Chang .................. G11C 16/20 |
| | | 713/1 |
| 2009/0037900 A1 | 2/2009 | von Khurja et al. |
| 2010/0011510 A1 | 5/2010 | Lee et al. |
| 2011/0154006 A1 | 6/2011 | Natu et al. |
| 2013/0019281 A1 | 1/2013 | Jacobs et al. |
| 2013/0103890 A1* | 4/2013 | Grunzke ................ G06F 3/061 |
| | | 711/E12.001 |
| 2013/0179480 A1 | 7/2013 | Agarwal et al. |
| 2014/0310536 A1 | 10/2014 | Shacham |
| 2015/0032913 A1 | 1/2015 | Kim et al. |
| 2015/0032915 A1 | 1/2015 | Hur et al. |
| 2015/0205339 A1 | 7/2015 | Park et al. |
| 2015/0301744 A1 | 10/2015 | Kim et al. |
| 2016/0034203 A1 | 2/2016 | Jang et al. |
| 2016/0034413 A1 | 2/2016 | Park |
| 2016/0239685 A1 | 8/2016 | Li et al. |
| 2018/0059954 A1 | 3/2018 | Hur |

OTHER PUBLICATIONS

Final Office Action dated Jan. 16, 2020 in Corresponding U.S. Appl. No. 15/690,849.

* cited by examiner

STORAGE DEVICE AND HOST FOR THE SAME

CROSS-REFERENCE TO RELATED APPLICATION

This application is a continuation of U.S. patent application Ser. No. 15/690,849 filed Aug. 30, 2017, which claims the benefit of and priority to U.S. Patent Application No. 62/382,393, filed on Sep. 1, 2016, in the U.S. Patent and Trademark Office, and Korean Patent Application No. 10-2017-0016850, filed on Feb. 7, 2017, in the Korean Intellectual Property Office, the disclosures of which are incorporated by reference in their entireties herein.

BACKGROUND

1. Technical Field

The inventive concept relates to a storage device and a host for the same, and more particularly, to a storage device that stores setting information for a host.

2. Discussion of Related Art

A storage system includes a host and a storage device, wherein the host and the storage device are connected to each other through various interface standards such as a Universal Flash Storage (UFS), Serial Advanced Technology Attachment (SATA), a Small Computer System Interface (SCSI), Serial Attached SCSI (SAS), embedded multimedia card (MMC) (eMMC), and the like. Examples of the storage device include volatile memory and non-volatile memory. Volatile memory is memory that requires power to maintain the stored information. Non-volatile memory is memory that can retrieve stored information even after power has been removed. An example of a host may be computer. However, the host and the storage device may not communicate with one another in an efficient manner when there are compatibility issues. Thus, there is a need to optimize communication between the host and the storage device due to these compatibility issues.

SUMMARY

At least one embodiment of the inventive concept provides a storage device capable of optimizing communication with a host by efficiently resolving compatibility issues.

At least one embodiment of the inventive concept provides a host of a storage system capable of optimizing communication with a storage device by efficiently resolving compatibility issues.

According to an exemplary of the inventive concept, there is provided a storage device including: a storage device communicably connected to a host; a nonvolatile memory configured to store calibration data of the host; and a calibration circuit configured to receive a descriptor from the host including setting information from the host and update the calibration data with the setting information.

According to an exemplary of the inventive concept, there is provided a host including a host interface communicably connected to a storage device; and a calibration controller configured to generate a descriptor including setting information and output the descriptor to the storage device to enable the storage device to update calibration data of the host with the setting information, wherein the descriptor includes at least one of a host identifier (ID) for the host requiring a setting change, an event requiring a setting change, an address of a functional block requiring the setting change, a setting value to be written to the address, and an option for performing the setting change.

According to an exemplary embodiment of the inventive concept, there is provided a storage device communicably connected to a host. The storage device includes: a volatile memory storing first calibration data for setting the storage device; a non-volatile memory storing second calibration data for setting the storage device; and a controller configured to receive a descriptor from the host, change the first calibration data using the descriptor when the storage device is in a volatile mode and change the second calibration data using the descriptor when the storage device is in a non-volatile mode.

BRIEF DESCRIPTION OF THE DRAWINGS

Exemplary embodiments of the inventive concept will be more clearly understood from the following detailed description taken in conjunction with the accompanying drawings in which.

DETAILED DESCRIPTION OF THE EXEMPLARY EMBODIMENTS

Figure 1:
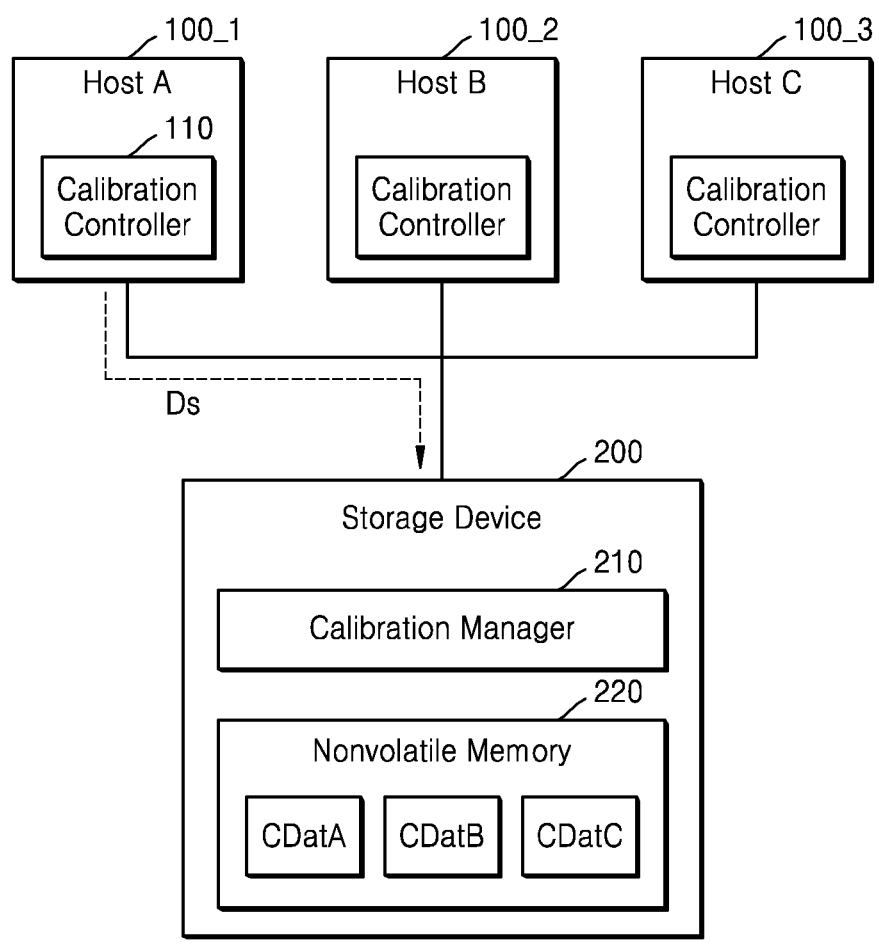
FIG. 1 is a block diagram of a storage system according to an exemplary embodiment of the inventive concept.

FIG. 1 is a block diagram of a storage system 10 according to an exemplary embodiment of the inventive concept.

Referring to FIG. 1, the storage system 10 includes a first host 100_1, a second host 100_2, a third host 100_3, and a storage device 200. Each of the first to third hosts 100_1 to 100_3 includes a calibration controller 110 and the storage device 200 includes a calibration manager 210 and a nonvolatile memory 220.

The nonvolatile memory 220 includes first calibration data CDatA, second calibration data CDatB, and third calibration data CDatC. The first calibration data CDatA includes setting information for the first host 100_1, the second calibration data CDatB includes setting information for the second host 100_2, and the third calibration data CDatC includes setting information for the third host 100_3. In an exemplary embodiment, the first to third calibration data CDatA to CDatC include host information, setting change event information, a target address, a setting value, and option information for the first to third hosts 100_1 to 100_3, respectively.

When there is a need to change settings for communication between the first host 100_1 and the storage device 200, the calibration controller 110 included in the first host 100_1 generates a descriptor Ds and transmits the descriptor Ds to the storage device 200. The descriptor Ds may be transmitted via a command signal. According to an exemplary embodiment of the inventive concept, the descriptor Ds is transmitted via a write command signal (e.g., a write buffer command signal). In an embodiment, the write command signal indicates to the storage device 200 that a host desires to write data to the storage device 200. A host may send the data to write along with the write command signal to the storage device 200. The storage device 200 may include a controller configured to receive the write command signal and the data to write. The controller may be configured to interpret the write command signal to extract the descriptor Ds.

The calibration manager 210 included in the storage apparatus 200 receives the descriptor Ds. In an embodiment, the calibration manager 210 updates the first calibration data CDatA based on the received descriptor Ds. In addition, the calibration manager 210 may change various settings of the storage device 200 using the updated first calibration data CDatA. To this end, the calibration manager 210 may be communicatively connected to various functional blocks of the storage device 200, which will be described later below with reference to FIG. 2.

The nonvolatile memory 220 may include, but is not limited to, NAND flash memory, vertical NAND (VNAND), NOR flash memory, resistive random-access memory (RRAM), phase-change RAM (PRAM), magnetoresistive RAM (MRAM), ferroelectric RAM (FRAM), spin-transfer torque RAM (STT-RAM). The nonvolatile memory 220 may be implemented as a three-dimensional (3D) array structure or the like. In addition, the nonvolatile memory 220 may be implemented as a magnetic disk device as well as a semiconductor memory device. An example embodiment of the inventive concept may be applied not only to flash memory in which a charge storage layer includes a conductive floating gate but also to charge trap flash (CTF) memory in which a charge storage layer includes an insulating film. Although the nonvolatile memory 220 is described herein as flash memory, it is to be understood that the inventive concept is not limited thereto.

The first to third hosts 100_1 to 100_3 included in the storage system 10 according to an exemplary embodiment of the inventive concept may resolve compatibility problems and perform optimization by transmitting the descriptor Ds to the storage device 200 through a command and updating the first to third calibration data CDatA to CDatC when compatibility problems occur or optimization is needed during an operation. Furthermore, the storage device 200 may respectively store and update the first to third calibration data CDatA to CDatC for the first to third hosts 100_1 to 100_3 in the nonvolatile memory 220 to efficiently manage settings of the hosts 100_1 to 100_3.

Although FIG. 1 only illustrates a case in which the calibration controller 110 included in the first host 100_1 transmits the descriptor Ds to the storage device 200 to update the first calibration data CDatA, this is only an example. The calibration controller 110 included in the second host 100_2 may transmit the descriptor Ds to update the second calibration data CDatB, and the calibration controller 110 included in the third host 100_3 may transmit the descriptor Ds to update the third calibration data CDatC. In addition, although FIG. 1 illustrates three hosts 100_1 to 100_3, the inventive concept is not limited thereto. For example, there may be less than three hosts or more than three hosts in alternate embodiments.

Figure 2:
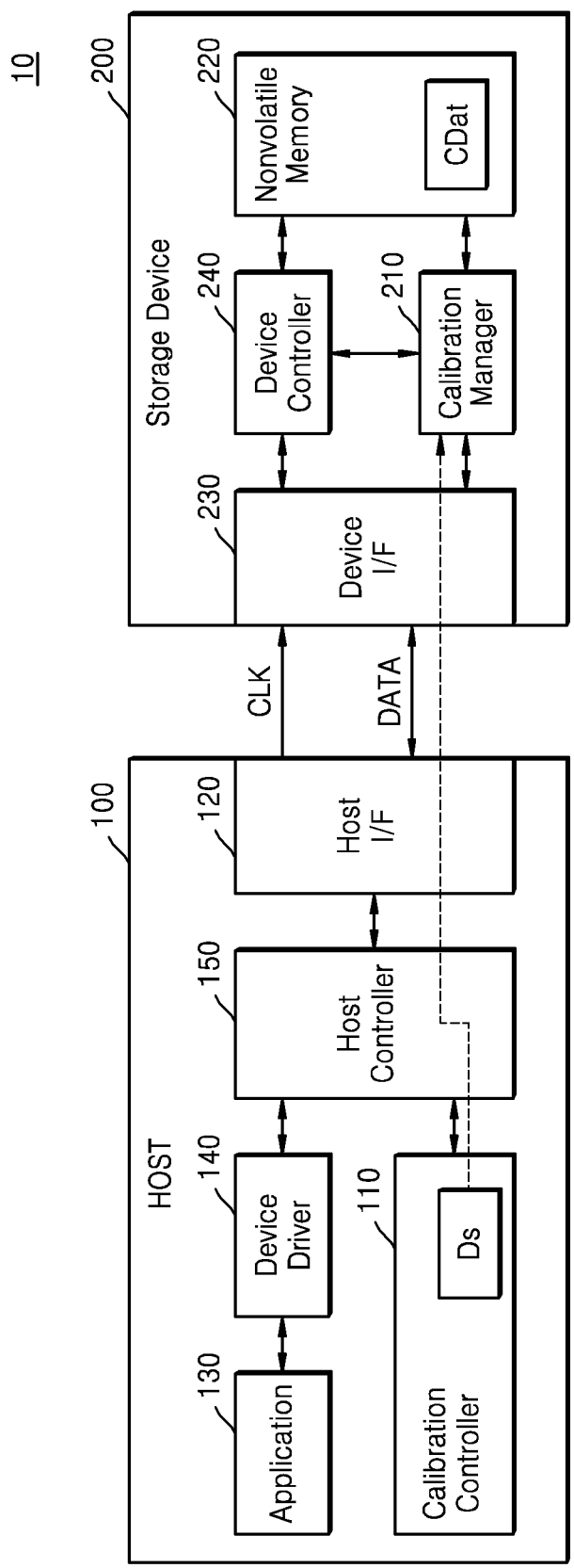
FIG. 2 is a block diagram of a storage system according to an exemplary embodiment of the inventive concept.

FIG. 2 is a block diagram of the storage system 10 according to an exemplary embodiment of the inventive concept. In FIG. 2, the same reference numerals as in FIG. 1 denote the same elements, and therefore, repeated descriptions thereof will not be given herein.

Referring to FIG. 2, the storage system 10 includes a host 100 and the storage device 200. The host 100 includes the calibration controller 110, a host interface 120, an application 130, a device driver 140, and a host controller 150. The storage device 200 includes the calibration manager 210 (e.g., a circuit), the nonvolatile memory 220, a device interface 230, and a device controller 240. Since the calibration controller 110, the calibration manager 210, and the nonvolatile memory 220 are described above with reference to FIG. 1, detailed descriptions thereof will not be given herein.

The host 100 and the storage device 200 may be connected to each other through standard interfaces such as an UFS, Serial Advanced Technology Attachment (SATA), Small Computer System Interface (SCSI), Serial Attached SCSI (SAS), and embedded multimedia card (eMMC). The host interface 120 and the device interface 230 may be connected to a data line for exchanging data or signals and a power line for providing power. The host interface 120 and the device interface 230 may transmit and receive data DATA and a reference clock CLK signal.

The application 130 may be one of various application programs executed in the host 100. The device driver 140 is for driving peripheral devices connected to the host 100 and may drive the storage device 200. The application 130 or the device driver 140 may be implemented through software or firmware. The host controller 150 may provide data to the storage device 200 or receive data from the storage device 200 via the host interface 120. Although not shown, the host 100 may further include memory. The memory may be used as main memory or cache memory of the host 100. The memory may also be used as driving memory for driving software such as the application 130 or the device driver 140.

In an embodiment, the calibration controller 110 generates and transmits the descriptor Ds to the storage device 200 via the host controller 150 and/or the host interface 120. While FIG. 2 illustrates the calibration controller 110 as a separate block, the inventive concept is not limited thereto. In an alternate embodiment of the inventive concept, the device driver 140 or the host controller 150 function as the calibration controller 110.

The storage device 200 is connected to the host 100 through the device interface 230. The device controller 240 may control general operations such as writing, reading, and erasing of the nonvolatile memory 220. The device controller 240 may exchange data with the nonvolatile memory 220 or a buffer memory (not shown) via an address or a data bus. Although not shown, the storage device 200 may further include buffer memory. The buffer memory may be used to temporarily store data to be stored in or read from the nonvolatile memory 220.

The calibration manager 210 may receive the descriptor Ds from the calibration controller 110 and write updated calibration data CDat to the nonvolatile memory 220 directly or indirectly via the device controller 240. In an embodiment, the calibration manager 210 changes settings of the device interface 230 using the updated calibration data CDat. In an embodiment, the settings of the device interface 230 are used to enable the storage device 200 to communicate with a given host in a more efficient manner. While FIG. 2 shows the calibration manager 210 as being separate from the device controller 240, the inventive concept is not limited thereto. For example, the calibration manager 210 may be included in the device controller 240.

Figure 3:
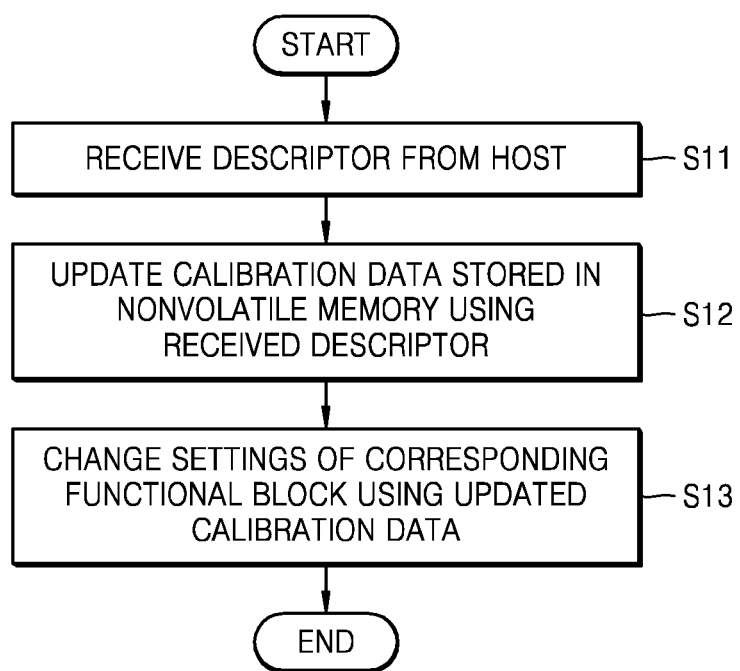
FIG. 3 is a flowchart of an operation method of a calibration manager according to an exemplary embodiment of the inventive concept.

FIG. 3 is a flowchart of an operation method of the calibration manager 210 according to an exemplary embodiment of the inventive concept.

Referring to FIGS. 1 and 3, in operation S11, the calibration manager 210 receives the descriptor Ds from the host 100. In operation S12, the calibration manager 210 updates the calibration data CDat stored in the nonvolatile memory 220 using the received descriptor Ds. In operation S13, the calibration manager 210 changes settings of a corresponding functional block using the updated calibration data CDat. For example, the corresponding functional block may be the device interface 230 of FIG. 2.

Figure 4:
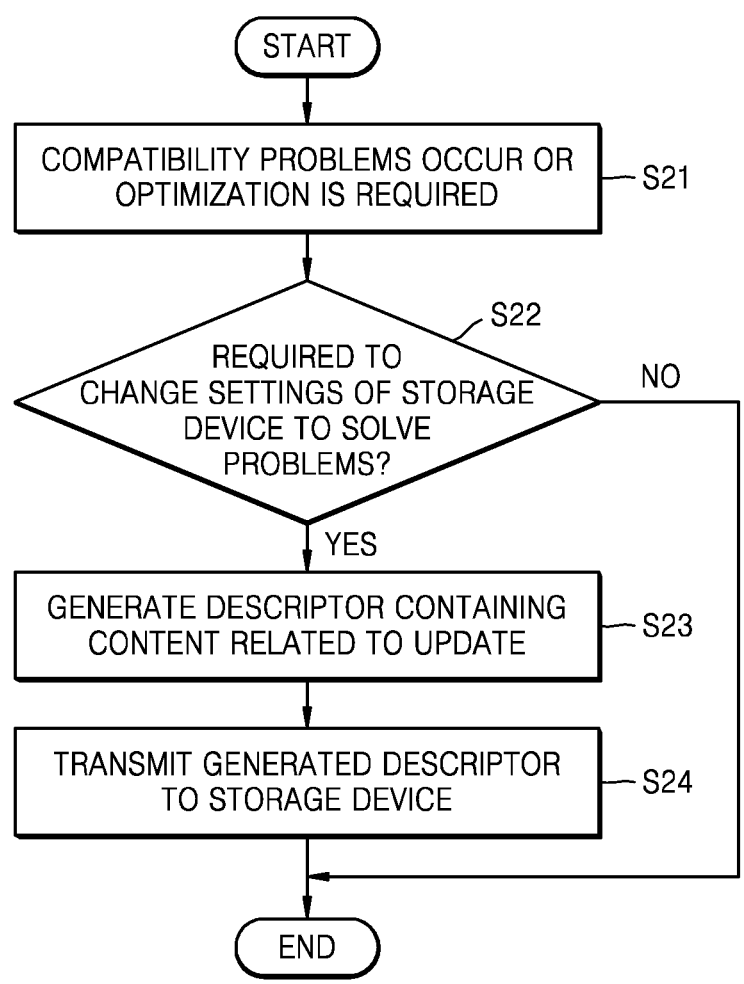
FIG. 4 is a flowchart of an operation method of a calibration controller according to an exemplary embodiment of the inventive concept.

FIG. 4 is a flowchart of an operation method of the calibration controller 110 according to an exemplary embodiment of the inventive concept.

Referring to FIGS. 1 and 4, when compatibility problems occur or optimization is required in operation S21, the calibration controller 110 then determines in operation S22 whether it is necessary to change settings of the storage device 200 to solve the problems. In an exemplary embodiment of the inventive concept, the calibration controller 110 determines whether the optimization needs to be performed by changing the settings of the storage device 200. In operation S23, if it is determined that it is necessary to change the settings of the storage device 200, the calibration controller 110 generates the descriptor Ds containing content related to an update. In operation S24, the calibration controller 110 transmits the generated descriptor Ds to the storage device 200. If it is determined that it is not necessary to change the settings of the storage device 200, the calibration controller 110 may terminate a process used to execute the steps of FIG. 4 without generating the descriptor Ds.

Figure 5:
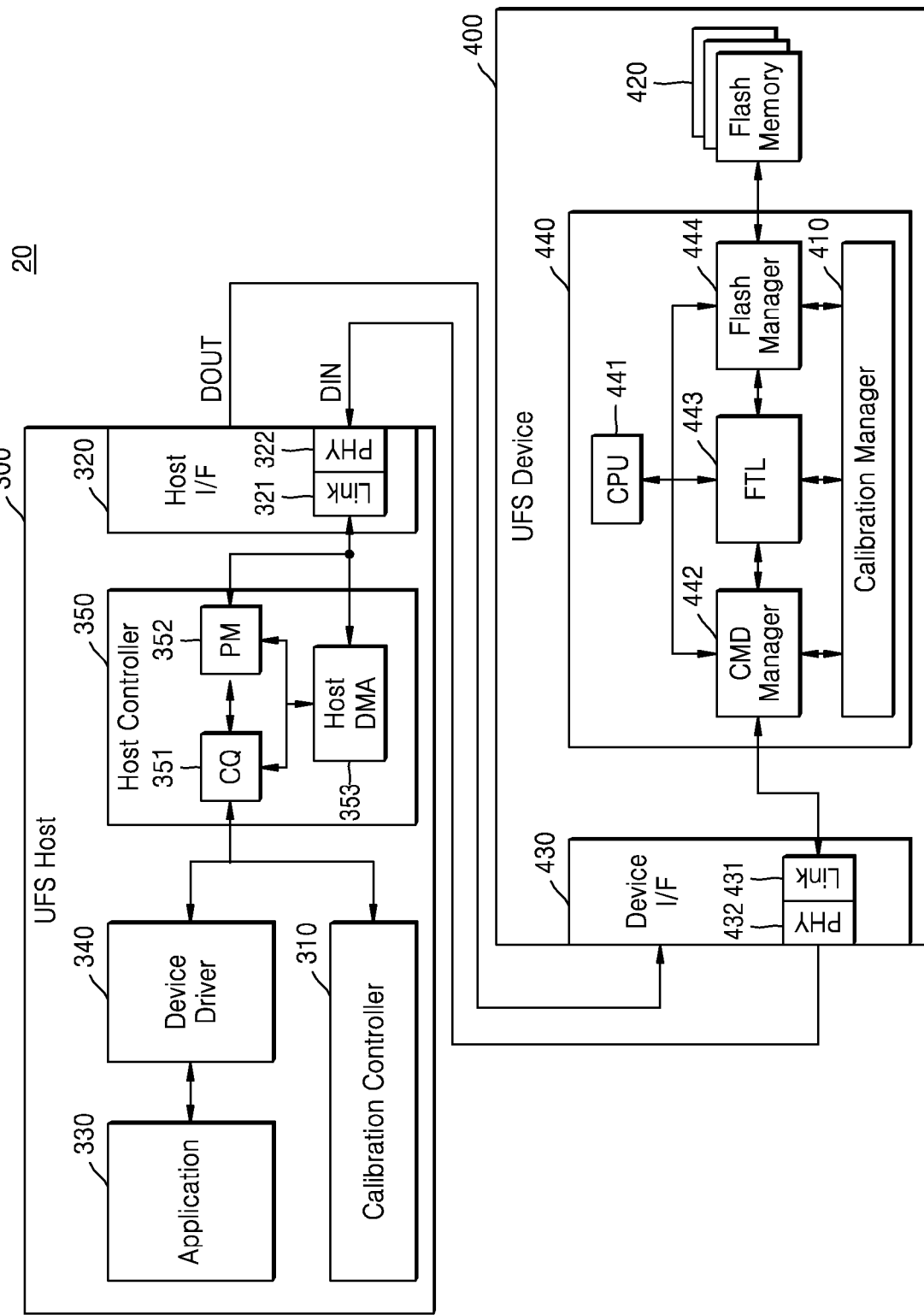
FIG. 5 is a block diagram of a universal flash storage (UFS) system based on flash memory, according to an exemplary embodiment of the inventive concept.

FIG. 5 is a block diagram of a UFS system 20 based on flash memory, according to an exemplary embodiment of the inventive concept. In FIG. 5, the same reference numerals as in FIG. 2 denote the same elements, and therefore, repeated descriptions thereof will not be given herein.

Referring to FIG. 5, the UFS system 20 includes a UFS host 300 and a UFS device 400. The UFS host 300 includes a calibration controller 310 (e.g., a controller circuit), a host interface 320 (e.g., an interface circuit), an application 330, a device driver 340, and a host controller 350. The host controller 350 includes a command queue (CQ) 351, a power manager (PM) 352, and a host direct memory access (DMA) 353. The UFS system 20 is an example of the storage system 10 of FIG. 1, and therefore, repeated descriptions thereof will not be given herein.

A command (for example, a write command) generated by the application 330 of the UFS host 300 and the device driver 340 may be input to the CQ 351 of the host controller 350. The CQ 351 sequentially stores commands to be provided to the UFS device 400. The commands stored in the CQ 351 may be provided to the host DMA 353. The host DMA 353 may send the commands to the UFS device 400 via the host interface 320.

The UFS device 400 includes a calibration manager 410, flash memory 420, a device interface 430, and a device controller 440. The device controller 440 includes a central processing unit (CPU) 441, a command (CMD) manager 442, a flash translation layer (FTL) 443, and a flash manager 444.

A command input from the UFS host 300 to the UFS device 400 may be provided to the command manager 442 via the device interface 430. Although not shown, the command and data may be provided to the command manager 442 via a DMA device (not shown). The UFS device 400 may store the received data in a buffer RAM (not shown). The data stored in the buffer RAM (not shown) may be provided to the flash manager 444, and the flash manager 444 may store the data in a selected address of the flash memory 420 by referring to address mapping information of the FTL 443. When data transmission and a program necessary for the command are completed, the UFS device 400 sends a response signal to the UFS host 300 via the device interface 430 and indicates that the command has been completed. The UFS host 300 may notify the device driver 340 and the application 330 of whether the command which corresponds to the received response signal has been completed, and may complete an operation for the command.

The host interface 320 includes a link layer 321 and a PHY layer 322 and the device interface 430 includes link layer 431 and a physical PHY layer 432 as an UFS interconnect layer. In an embodiment, the link layers 321 and 431 are MIPI UniPro and the PHY layers 322 and 432 are MIPI M-PHY. In an embodiment, the PHY layer 432 refers to the circuitry required to implement physical layer functions. The PHY layer 432 may connect a link layer device to a physical medium. The MIPI M-PHY may be a serial communication protocol for use in mobile systems.

According to an exemplary embodiment of the inventive concept, the UFS host 300 transmits the descriptor Ds through a command to the UFS device 400. The calibration manager 410 may update the calibration data CDat using the descriptor Ds in the flash memory 420 via the CPU 441, the FTL 443, and the flash manager 444. The calibration manager 410 may also change settings of functional blocks included in the UFS device 400 using the calibration data CDat stored in the flash memory 420, directly or via the command manager 442. In specification, a functional block refers to a block (e.g., the device interface 430, the CPU 441, the command manager 442, the FTL 443, the flash manager 444, etc.) performing a specific function. In an exemplary embodiment of the inventive concept, the calibration manager 410 changes a setting value of a register included in the link layer 431 and the PHY layer 432 based on the updated calibration data CDat.

Figure 6:
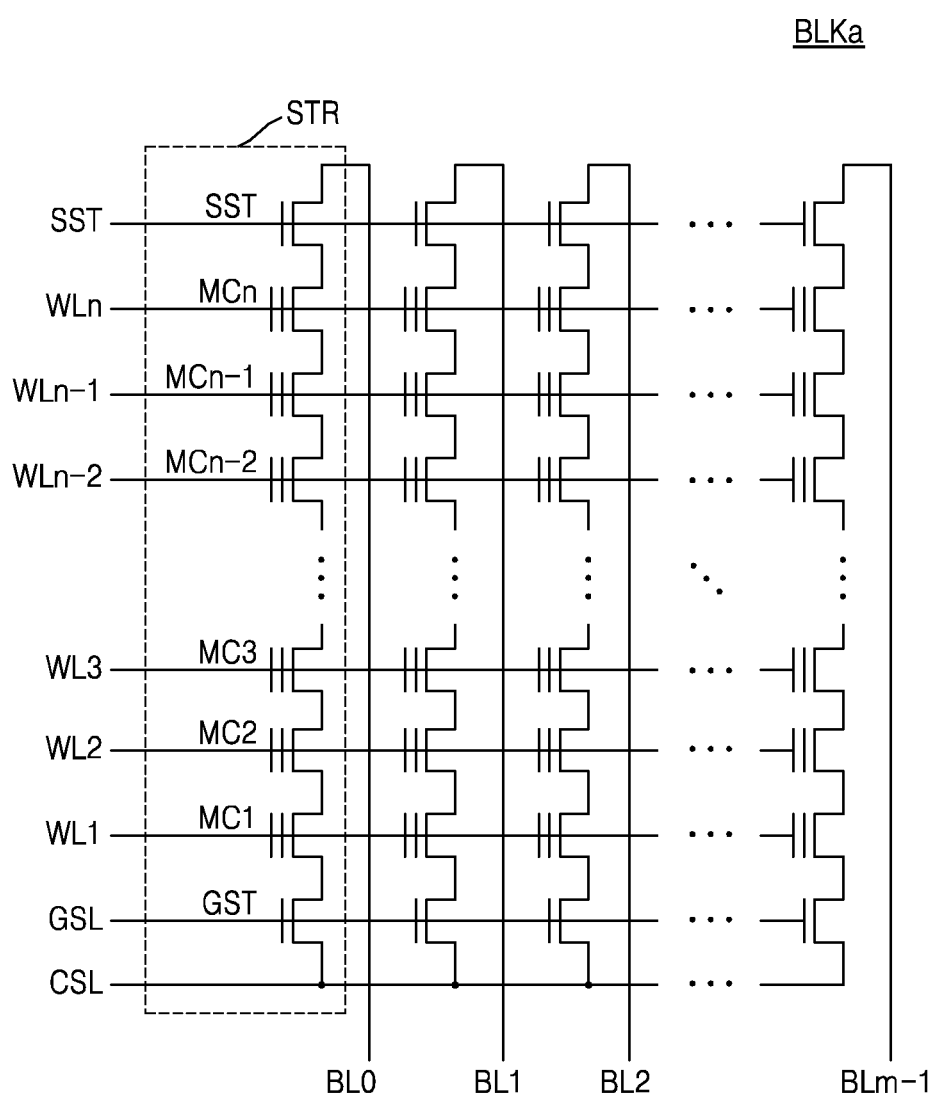
FIG. 6 is a circuit diagram of a memory block included in a memory cell array, according to an exemplary embodiment of the inventive concept.

FIG. 6 is a circuit diagram of a memory block BLKa included in a memory cell array, according to an exemplary embodiment of the inventive concept.

Referring to FIG. 6, a nonvolatile memory (e.g., 220 of FIG. 1) may include a memory cell array of horizontal NAND flash memory and a plurality of memory blocks. The memory block BLKa may include n (n is an integer equal to or greater than 2) cell strings STRs in which a plurality of memory cells MC are connected in series in a direction of bit lines BL0 through BLm-1. FIG. 6 shows an example in which each cell string STR includes eight memory cells.

A NAND flash memory device having the structure shown in FIG. 6 is erased on a block basis and executes a program in page units corresponding to each of word lines WL0 through WLn. FIG. 6 shows an example in which n pages for n word lines WL1 to WLn are provided in one block.

Figure 7:
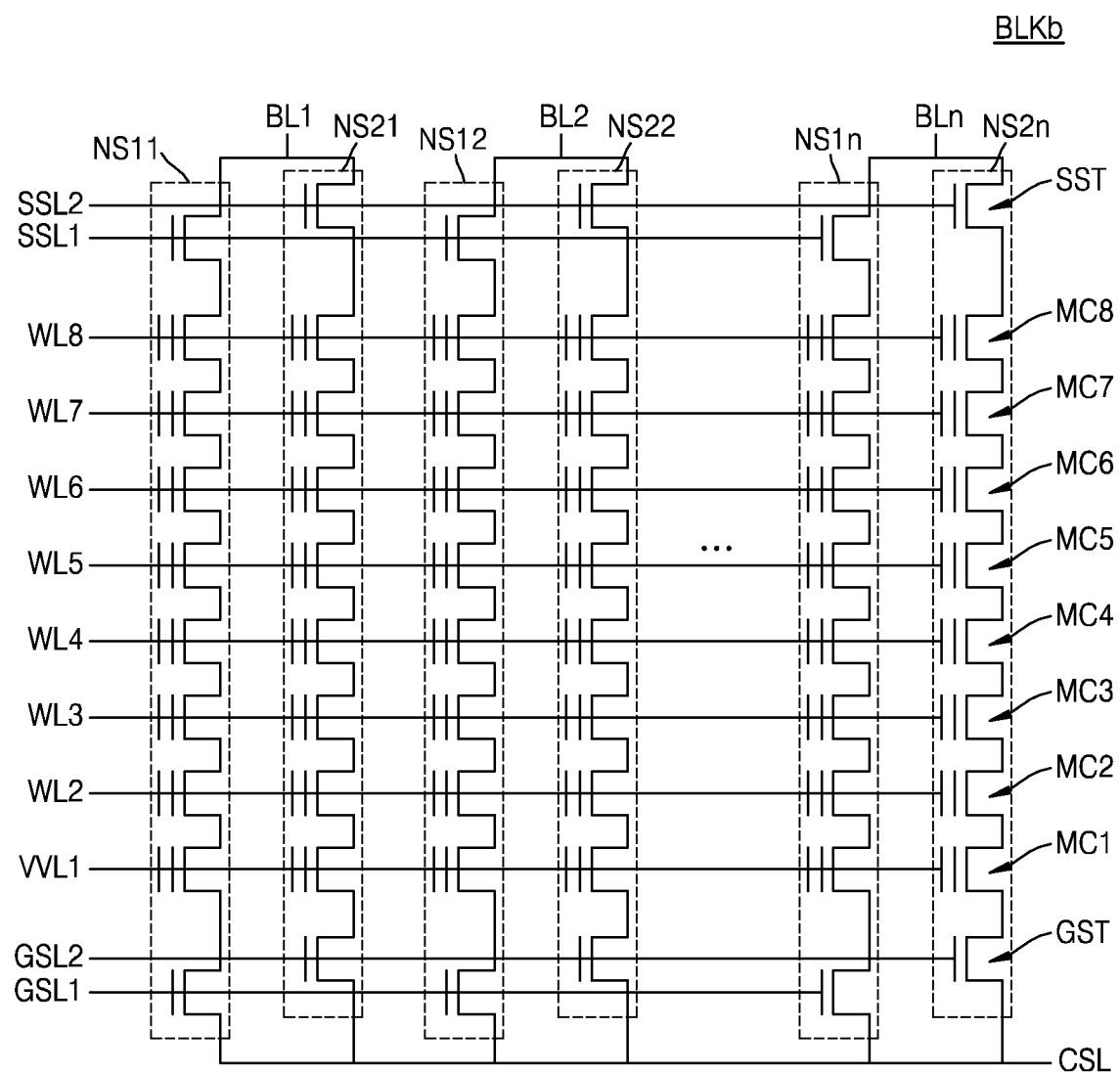
FIG. 7 is a circuit diagram of a memory block included in a memory cell array, according to an exemplary embodiment of the inventive concept.

FIG. 7 is a circuit diagram of a memory block BLKb included in a memory cell array, according to an exemplary embodiment of the inventive concept.

Referring to FIG. 7, the memory block BLKb may be horizontal NAND flash memory. The memory block BLKb may include a plurality of cell strings NS11 to NS2n, word lines WL1 to WL8, bit lines BL1 to BLn, ground selection lines GSL1 and GSL2, string selection lines SSL1 and SSL2, and a common source line CSL. Here, the number of the cell strings, the number of the word lines, the number of the bit lines, the number of the ground selection lines, and the number of the string selection lines may be variously changed according to an example embodiment. In particular, as the number of memory cells MC1 to MC8 corresponding to the word lines is increased, the number of the string selection lines may be increased, and thus program disturbance may be increased.

A plurality of cell strings may share the word lines WL1 to WL8, and at least two cell strings may share a single bit line. Cell strings sharing a single bit line may be connected to respective string selection lines and respective ground selection lines. For example, the cell strings NS11 and NS21 may share the first bit line BL1, a string selection transistor SST and a ground selection transistor GST of the cell string NS11 may share a first string selection line SSL1, and the string selection transistor SST and the ground selection transistor GST of the cell string NS21 may be connected to the second string selection line SSL2 and the second ground selection line GSL2. Accordingly, when data is read from memory cells connected to the first word line WL1 and belonging to the cell strings NS11 to NS1n, the first word line WL1, the first string selection line SSL1, and the first ground selection line GSL1 may be selected.

Figure 8:
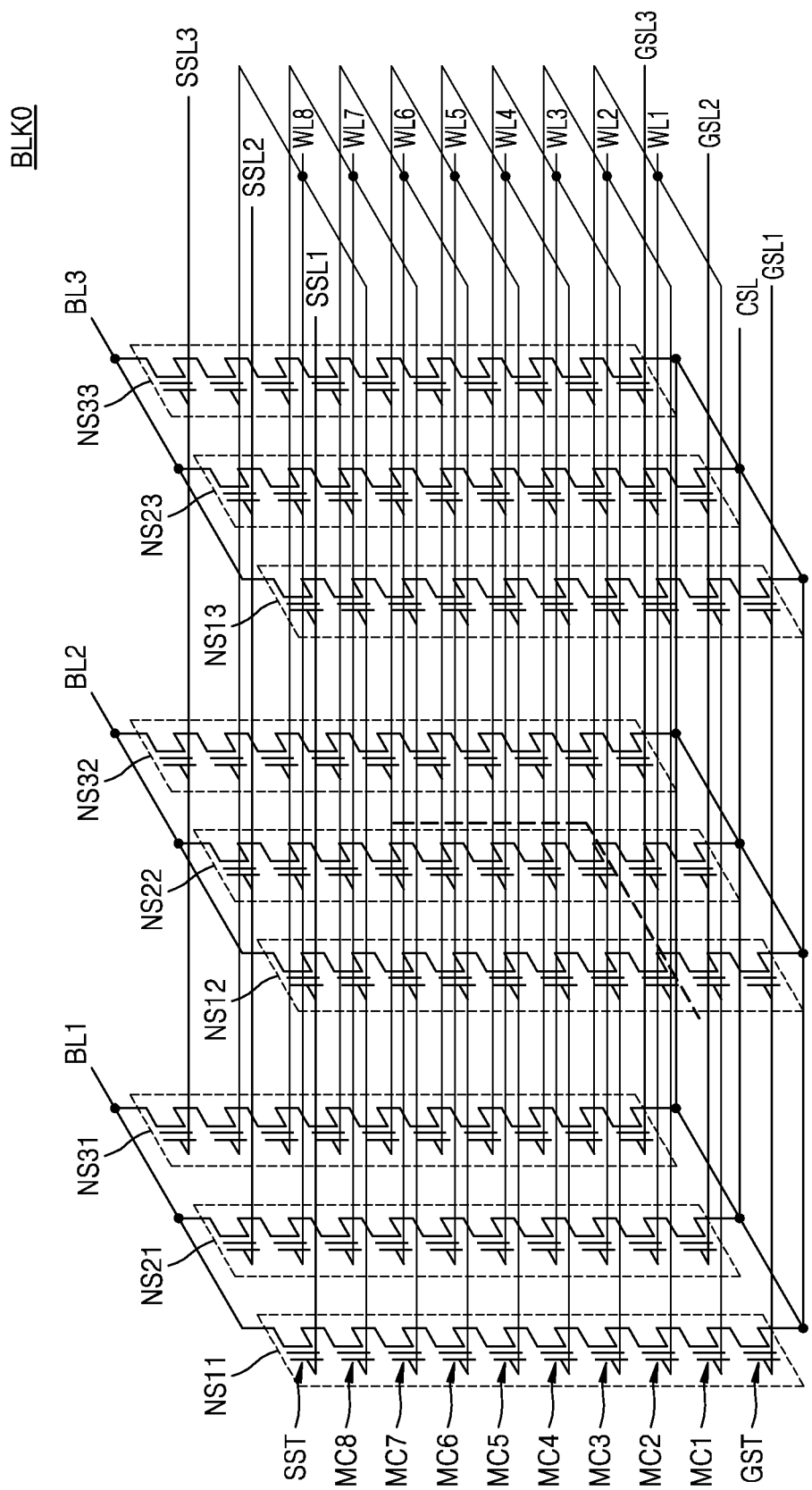
FIG. 8 is a circuit diagram of a memory block included in a memory cell array, according to an exemplary embodiment of the inventive concept.

FIG. 8 is a circuit diagram of a memory block BLK0 included in a memory cell array, according to an exemplary embodiment of the inventive concept.

Referring to FIG. 8, the nonvolatile memory (e.g., 220 of FIG. 1) may include a memory cell array of vertical NAND flash memory and a plurality of memory blocks. The memory block BLK0 may include NAND cell strings NS11 to NS33, the word lines WL1 to WL8, bit lines BL1 to BL3, ground selection lines GSL1 to GSL3, string selection lines SSL1 to SSL3, and the common source line CSL. The number of the NAND cell strings, the number of the word lines, the number of the bit lines, the number of the ground selection lines, and the number of the cell string selection lines may be variously changed according to an example embodiment.

The NAND cell strings NS11, NS21 and NS31 are provided between the first bit line BL1 and the common source line CSL, the NAND cell strings NS12, NS22 and NS32 are provided between the second bit line BL2 and the common source line CSL, and the NAND cell strings NS13, NS23 and NS33 are provided between the third bit line BL3 and the common source line CSL. Each NAND cell string (e.g., NS11) may include the cell string selection transistor SST, the memory cells MC1 to MC8, and the ground selection transistor GST connected in series.

Cell strings connected in common to a single bit line form one column. For example, the cell strings NS11, NS21, and NS31 connected in common to the first bit line BL1 may correspond to a first column, the cell strings NS12, NS22, and NS32 connected in common to the second bit line BL2 may correspond to a second column, and the cell strings NS13, NS23, and NS33 connected in common to the third bit line BL3 may correspond to a third column.

Cell strings connected to one string selection line form one row. For example, the cell strings NS11, NS12, and NS13 connected to the first cell string selection line SSL1 may correspond to a first row, the cell strings NS21, NS22, and NS23 connected to the second cell string selection line SSL2 may correspond to a second row, and the cell strings NS31, NS32, and NS33 connected to the third cell string selection line SSL3 may correspond to a third row.

The cell string selection transistor SST is connected to a corresponding string selection line among the string selection lines SSL1 to SSL3, respectively. The plurality of memory cells MC1 to MC8 are connected to the corresponding word lines WL1 to WL8, respectively. The ground selection transistor GST is connected to a corresponding ground selection line among the ground selection lines GSL1 to GSL3. The cell string selection transistor SST is connected to a corresponding bit line among the bit lines BL1 to BL3, and the ground selection transistor GST is connected to the common source line CSL.

Word lines (e.g., WL1) having the same height are commonly connected to each other. The cell string selection lines SSL1 to SSL3 are separated from each other, and the ground selection lines GSL1 to GSL3 are also separated from each other. For example, when memory cells connected to the first word line WL1 and belonging to the cell strings NS11, NS12, and NS13 are programmed, the first word line WL1 and the first cell string selection line SSL1 are selected. The ground selection lines GSL1 to GSL3 may be commonly connected to each other.

Figure 9:
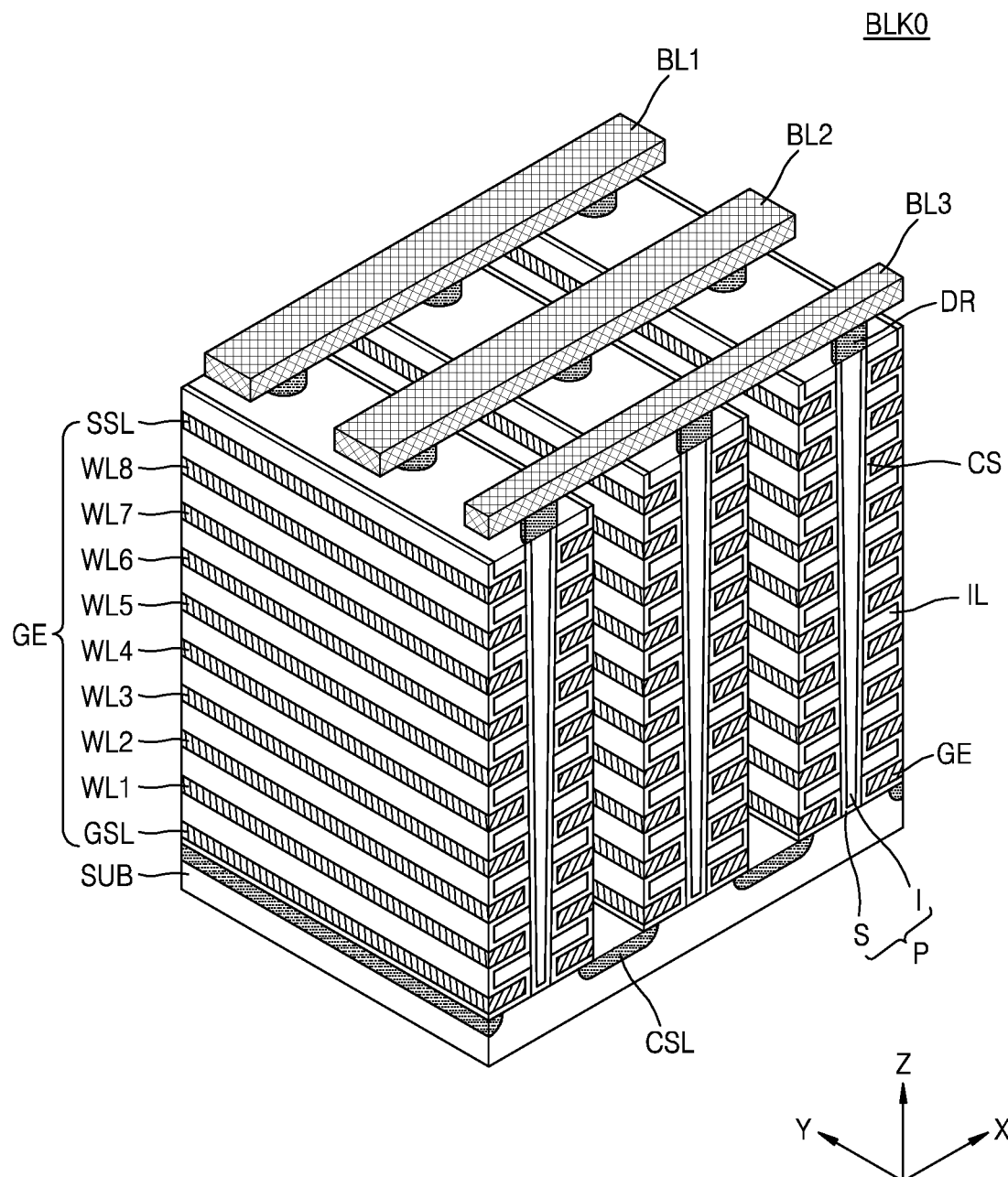
FIG. 9 is a perspective view of the memory block of FIG. 8.

FIG. 9 is a perspective view of the memory block BLK0 of FIG. 8.

Referring to FIG. 9, each memory block included in, e.g., the memory cell array 110 (of FIG. 2) is formed in a direction perpendicular to a substrate SUB. Although FIG. 9 shows that a memory block includes two selection lines GSL and SSL, eight word lines WL1 to WL8, and three bit lines BL1 to BL3, each of these elements may be included in a number more or less than these in practice.

The substrate SUB has a first conductivity type (e.g., a p-type) and extends in a first direction (e.g., a Y-direction), and the common source line CSL doped with impurities of a second conductivity type (e.g., an n-type) is provided. A plurality of insulating layers IL extending along the first direction are sequentially provided along a third direction (e.g., a Z-direction) on regions of the substrate SUB between two adjacent common source lines CSL, and the plurality of insulating layers IL are spaced apart from each other by a specific distance along the third direction. For example, the plurality of insulating layers IL may include an insulating material such as a silicon oxide.

A plurality of pillars P arranged sequentially along the first direction and passing through the plurality of insulating layers IL along the third direction are provided on the region of the substrate SUB between two adjacent common source lines CSL. For example, the plurality of pillars P may penetrate the plurality of insulating layers IL and contact the substrate SUB. In an embodiment, a surface layer S of each pillar P includes a first type of silicon material and functions as a channel region. An inner layer I of each pillar P may include an insulating material such as a silicon oxide or an air gap.

In the regions between two adjacent common source lines CSL, a charge storage layer CS is provided along exposed surfaces of the insulating layers IL, the pillars P, and the substrate SUB. The charge storage layer CS may include a gate insulating layer (referred to as a tunneling insulating layer), a charge trap layer, and a blocking insulating layer. For example, the charge storage layer CS may have an oxide-nitride-oxide (ONO) structure. In addition, in the region between two adjacent common source lines CSL, a gate electrode GE including the selection lines GSL and SSL and the word lines WL1 to WL8 is formed on an exposed surface of the charge storage layer CS.

Drains or drain contacts DR are provided on the plurality of pillars P, respectively. For example, the drains or drain contacts DR may include a silicon material doped with impurities of a second conductivity type. The bit lines BL1 to BL3 extending in a second direction (e.g., an X-direction) and spaced apart by a certain distance along the first direction are provided on the drains DR.

Figure 10:
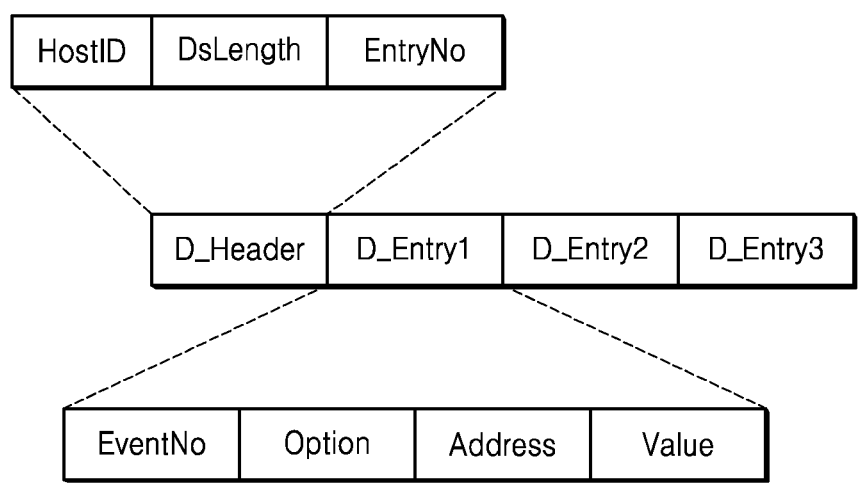
FIG. 10 is a table illustrating an example of a descriptor according to an exemplary embodiment of the inventive concept.

FIG. 10 is a table illustrating an example of the descriptor Ds according to an exemplary embodiment of the inventive concept.

Referring to FIGS. 1 and 10, the descriptor Ds includes a header D_Header, a first entry D_Entry1, a second entry D_Entry2, and a third entry D_Entry3. The header D_Header denotes general information of the descriptor Ds and includes a host ID HostID, a length of the descriptor DsLength, and an entry number EntryNo. Furthermore, entries D_Entry1 to D_Entry3 denote setting information to be changed for each event and include an event number EventNo, an option Option, an address Address, and a setting value Value. In FIG. 10, the descriptor Ds includes the first entry D_Entry1, the second entry D_Entry2, and the third entry D_Entry3 so that setting information for three events may be changed. However, it should be understood that this is merely an example as the number of entries may be more than three or less than three.

The host ID HostID includes information identifying a host that generates and transmits the descriptor Ds. That is, the storage device 200 may find, through the host ID HostID, a target host whose setting is to be changed. For example, the target host may be one of the first to third hosts 100_1 to 100_3. The length of the descriptor DsLength indicates the total amount of data of the descriptor Ds to be transmitted. In an exemplary embodiment of the inventive concept, the length of the descriptor DsLength refers to the total amount of data of entries excluding the header D_Header. In an embodiment, the size of each entry is the same and predefined. The entry number EntryNo is the total number of the entries D_Entry1 to D_Entry3 included in the descriptor Ds. The storage device 200 may find the amount of data for each of the entries D_Entry1 to D_Entry3 using the length of the descriptor DsLength and the entry number EntryNo. For example, if the length of the descriptor DsLength is 96 bits and the entry number EntryNo is 3, the storage device 200 may determine that 32 bits are allocated per entry when each entry has the same size. When there is only one entry, the entry number EntryNo may be omitted from the descriptor Ds. When the size of each entry is the same and known by the system, the length of the descriptor DsLength may be omitted from the descriptor Ds.

The event number EventNo may include information about an incident or an event (hereinafter, referred to as an event) whose setting is to be changed. A plurality of events may occur in the storage device 200, and a predetermined specific number may be set for the plurality of events. The descriptor Ds may include information on the event number EventNo for an event whose setting is to be changed. An example of the event may be Power On, Linkup Success/Fail, and Hibernation Mode Enter/Exit. A Power On event may indicate that a host device has been powered on. A Linkup Success event may indicate that a host device has established a connection to the storage device 200. A Linkup Fail event may indicate a host device was not able to establish the connection. A Hibernation Mode Enter event may indicate that a host device has entered a low power state. A Hibernation Mode Exit event may indicate that a host device has exited the low power state and entered a high power state. In an embodiment, the host device execute a first number of functions in the lower power state, executes a second number of functions in the high power state, and the first number is less than the second number. In an embodiment, the host device executes a first set of functions in the lower power state, executes a second set of functions in the high power state, where the first set of functions uses less power than the second set of functions. The storage device 200 may include an event table that includes several entries indexable by the event number EventNo, where each entry indicates a different event.

The option Option may include information about conditions under which a setting change is to be applied. In an embodiment, the storage device 200 applies the setting change only when the storage device 200 meets the conditions of the option Option even if an event occurs. Examples of the option Option may include a target power mode, a target lane, and a target transmission/reception terminal Target Rx/Tx. When the option Option is in a specific target power mode, the storage device 200 may change the setting only when an event occurs in the specific target power mode. The storage device 200 may change the setting only for a specific lane of the device interface 230 when the option Option is a specific lane, and the storage device 200 may change the setting only for any one of Target Tx and Target Rx when the option Option is the target transmission/reception terminal. The option Option may be omitted.

The address may indicate a register address of a functional block in which a setting is changed via the descriptor Ds. In addition, the set value Value may denote a new setting value to be stored in the address Address. For example, although a value stored in an existing address is '0', '1' may be newly stored as the set value Value. The address may be omitted. For example, if the storage device 200 could include table containing address of functional blocks whose settings are to be changed in response to receipt of a descriptor including a particular event number.

Although not shown, in addition to the above information, the descriptor Ds may further include at least one of a descriptor code indicating whether the data stream is a descriptor, information on whether to apply a setting change, and a setting update mode. The hosts 100_1 to 100_3 may transmit the descriptor Ds to the storage device 200 via a command. The descriptor code may be a predetermined code for the storage device 200 to distinguish the descriptor Ds from a general command. The information on whether to apply a setting change may indicate whether to apply a setting change for each entry. The setting update mode may display information on a mode that can be selected when a setting is changed, which will be described later below in detail with reference to FIG. 13.

When the hosts 100_1 to 100_3 transmit the descriptors Ds to the storage device 200, the descriptors Ds may be transmitted in a form of a data stream included in a command. The hosts 100_1 to 100_3 may acquire data classification information of the data stream from the storage device 200 before transmitting the descriptors Ds, and may generate a corresponding descriptor Ds. As an example, the data classification information of the data stream may be address classification information determined in advance by a manufacturer of the storage device 200. As another example, the data classification information of the data stream may be address classification information determined as a standard.

Figure 11:
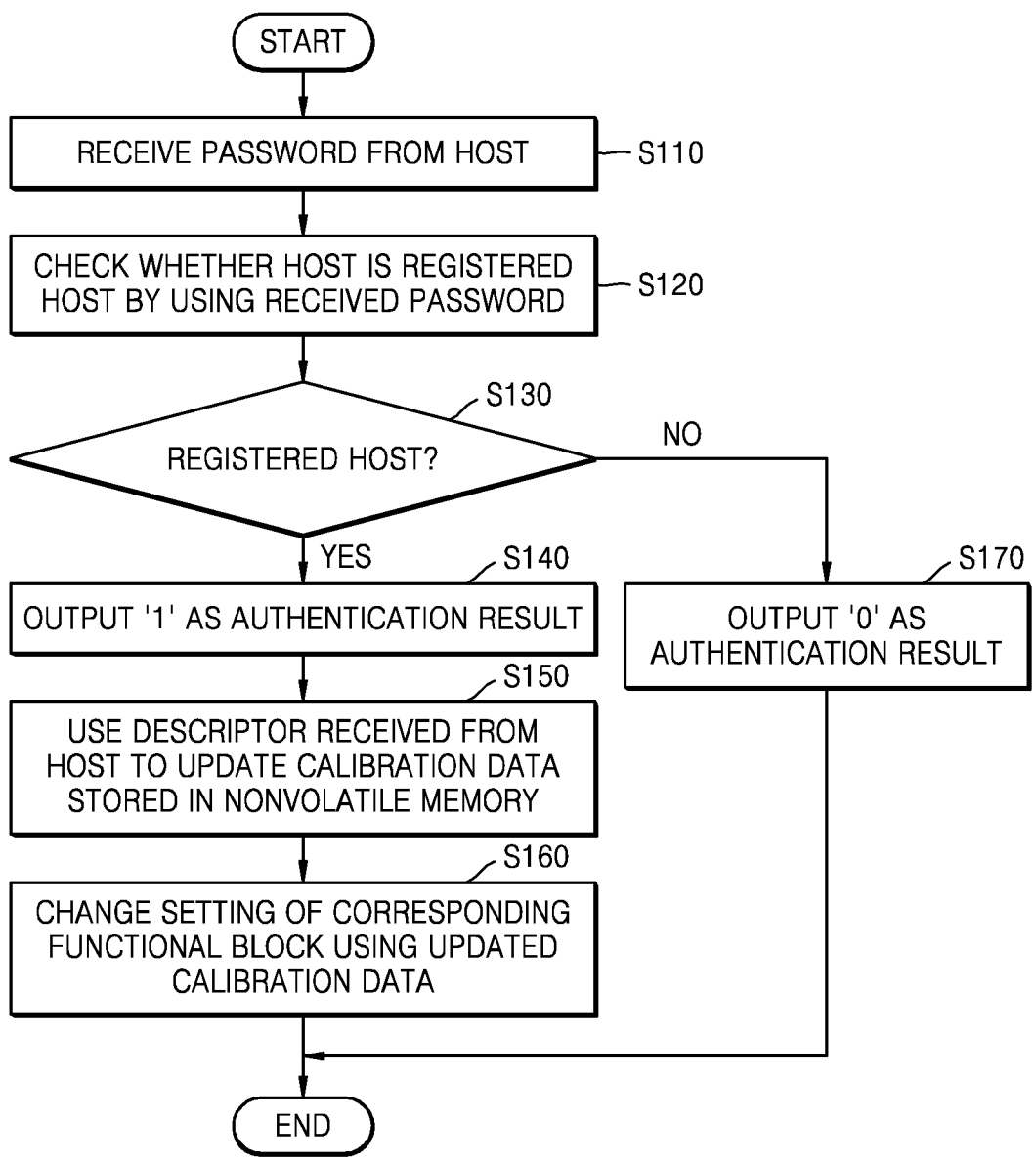
FIG. 11 is a view of an operation method of a storage device, according to an exemplary embodiment of the inventive concept.

FIG. 11 is a view of an operation method of the storage device 200, according to an exemplary embodiment of the inventive concept. FIG. 11 is a diagram of an exemplary embodiment in which the storage device 200 undergoes an authentication procedure for the host 100 before transmitting a descriptor.

Referring to FIGS. 2 and 11, in operation S110, the storage device 200 receives a password from the host 100. According to an exemplary embodiment of the inventive concept, the host 100 sends a password to the storage device 200 via an authentication command. In operation S120, the storage device 200 checks whether the host 100 is a registered host by using the received password. In an embodiment, the storage device 200 checks whether the host 100 is a registered host according to whether the received password matches a password stored in advance.

In operation S130, if it is determined that the host 100 is a registered host, that is, if the received password matches the password stored in advance, then in operation S140, the storage device 200 outputs '1' as an authentication result to the host 100. In operation S150, the host 100 transmits the descriptor Ds to the storage device 200 when receiving '1' as an authentication result, and the storage device 200 may use the descriptor Ds received from the host 100 to update the calibration data CDat stored in the nonvolatile memory 220. In operation S160, the storage device 200 changes a setting of a corresponding functional block using the updated calibration data CDat.

In operation S130, if it is determined that the host 100 is not a registered host, that is, if the received password does not match the password stored in advance, then in operation S170, the storage device 200 outputs '0' as an authentication result to the host 100. Even when receiving the descriptor Ds from the host 100, the storage device 200 may output a fail signal to the host 100 without using the received descriptor Ds. For example, the output of the '0' as the authentication result to the host 100 could be considered the fail signal. While the above describes use of '1' to indicate the host has been registered and '0' to indicate the host has not been registered, the inventive concept is not limited thereto, as other values may be used to indicate the same information.

Although FIG. 11 performs authentication using a password as an example, it is to be understood that the inventive concept may be applied to other methods by which the storage device 200 authenticates the host 100.

Figure 12:
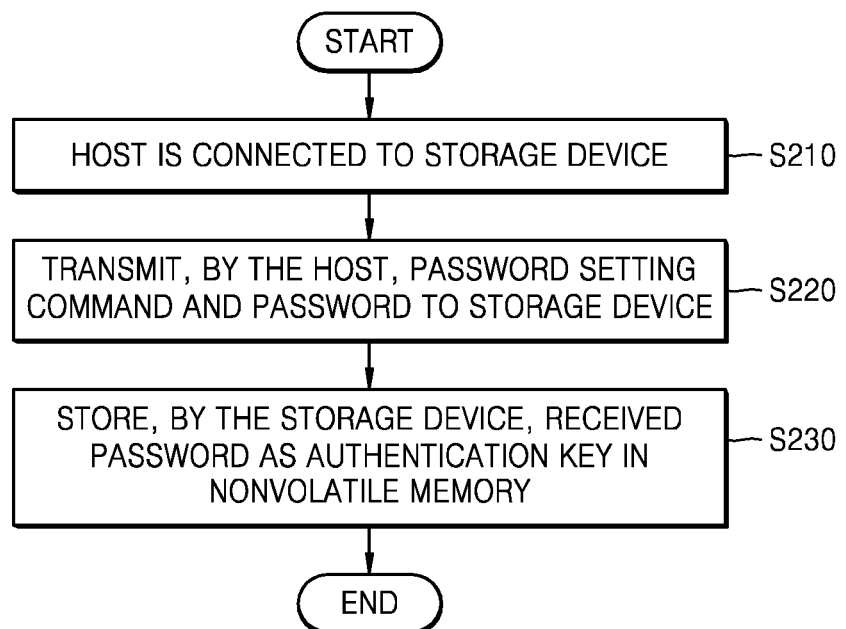
FIG. 12 is a flowchart of an operation method of a storage system, according to an exemplary embodiment of the inventive concept.

FIG. 12 is a flowchart of an operation method of a storage system, according to an exemplary embodiment of the inventive concept. In more detail, FIG. 12 is a flowchart showing a password setting method of a storage system.

Referring to FIGS. 2 and 12, in operation S210, the host 100 is connected to the storage device 200, then in operation S220, the host 100 transmits a password setting command (e.g., a command to set the password) and a password to the storage device 200. In operation S230, the storage device 200 stores the received password as an authentication key for the host 100 in the nonvolatile memory 220. The storage device 200 may use the password received as an authentication key in the authentication procedure as shown in FIG. 11.

Figure 13:
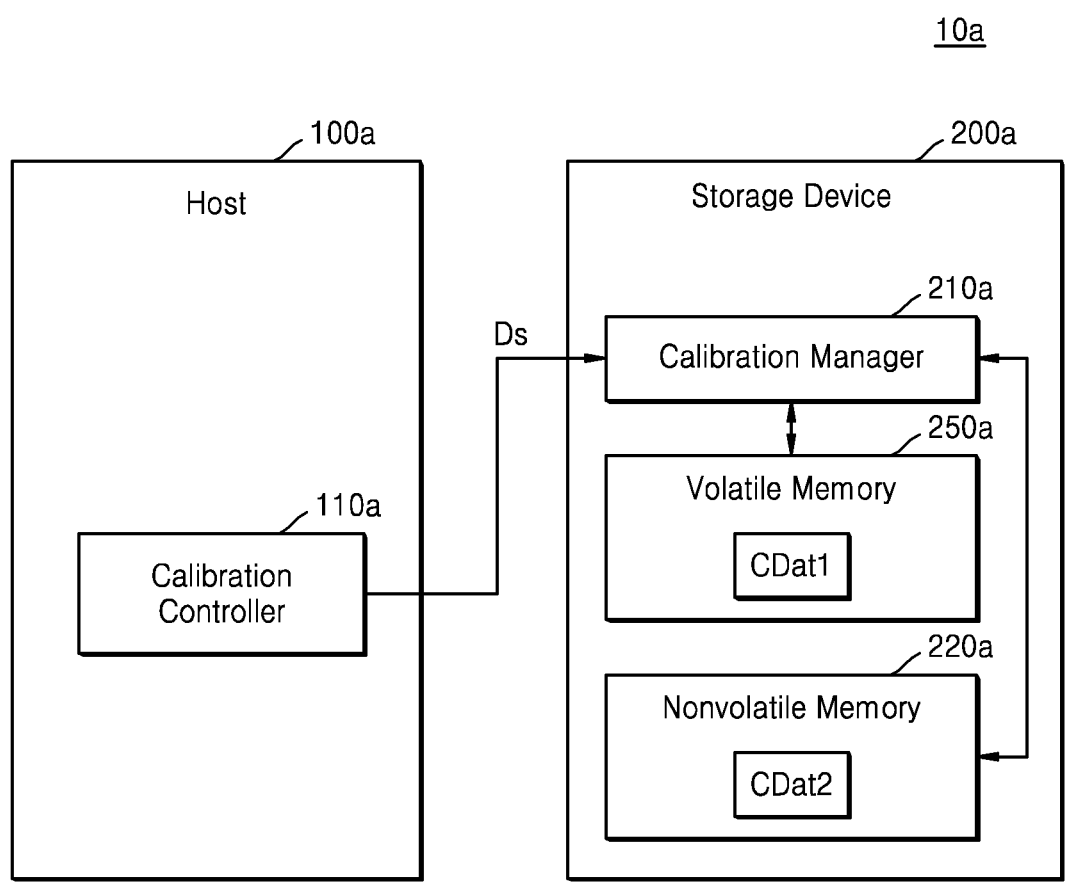
FIG. 13 is a block diagram of a storage system according to an exemplary embodiment of the inventive concept.

FIG. 13 is a block diagram of a storage system 10a according to an exemplary embodiment of the inventive concept. In FIG. 13, the same reference numerals as in FIG. 2 denote the same elements, and therefore, repeated descriptions thereof will not be given herein.

Referring to FIGS. 2 and 13, the storage system 10a includes a host 100a and a storage device 200a, and the host 100a includes a calibration controller 110a. The storage device 200a includes a calibration manager 210a, a nonvolatile memory 220a, and a volatile memory 250a. In an embodiment, the calibration manager 210a and the nonvolatile memory 220a correspond to the calibration manager 210 and the nonvolatile memory 220 of FIG. 2, respectively.

The volatile memory 250a stores first calibration data CDat1. The volatile memory 250a refers to memory that loses data when power is turned off and may include, but is not limited to, static random-access memory (SRAM), dynamic RAM (DRAM), a latch, a flip-flop, or a register.

The calibration controller 110a generates the descriptor Ds and transmits the same to the calibration manager 210a. The descriptor Ds may include information regarding an update mode. The update mode may be set to one of a nonvolatile update mode, a volatile update mode, and a verification update mode. The calibration manager 210a may analyze the information regarding the update mode included in the descriptor Ds.

In an embodiment, the nonvolatile update mode indicates an update mode in which the storage device 200a is continuously operated according to a setting of the received descriptor Ds even after power is turned off. In an embodiment, the volatile update mode refers to an update mode for operating the storage device 200a according to a setting of the received descriptor Ds when power is turned on and operating the storage device 200a according to a previous setting when power is turned off. In an embodiment, the verification update mode refers to an update mode for performing an update according to the descriptor Ds and determining whether performance has been improved due to the update.

In an embodiment when the update mode is a nonvolatile update mode, the calibration manager 210a updates a second calibration data CDat2 stored in the nonvolatile memory 220a using the received descriptor Ds. Thereafter, the calibration manager 210a may change a setting of the storage device 200a using the updated second calibration data CDat2.

In an embodiment when the update mode is a volatile update mode, the calibration manager 210a generates the first calibration data CDat1 using the received descriptor Ds and stores the first calibration data CDat1 in the volatile memory 250a. Thereafter, the calibration manager 210a may change a setting of the storage device 200a using the generated first calibration data CDat1.

In an embodiment when the update mode is a verification update mode, the calibration manager 210a generates the first calibration data CDat1 using the received descriptor Ds and stores the first calibration data CDat1 in the volatile memory 250a. Thereafter, the calibration manager 210a may change a setting of the storage device 200a using the generated first calibration data CDat1 and check whether performance of the storage device 200a is improved. If the performance is improved, the calibration manager 210a may update the second calibration data CDat2 stored in a nonvolatile memory device based on the first calibration data CDat1. If the performance is not improved, the calibration manager 210a may output a signal requesting retransmission of the descriptor Ds to the host 100a.

In an exemplary embodiment of the inventive concept, the storage device 200a has different authentication levels per update mode. In a nonvolatile update mode, if wrong calibration data CDat is stored in the nonvolatile memory 220a, the wrong calibration data CDat may not be recovered due to the nature of the nonvolatile memory 220a. Accordingly, the storage device 200a may store the second calibration data CDat2 corresponding to the descriptor Ds that is authenticated and encrypted by a manufacturer of the storage device 200a in the nonvolatile memory 220a. In a volatile update mode, the storage device 200a may store the first calibration data CDat1 in the volatile memory 250a without encryption because the storage device 200a returns to a previous setting when power is turned off.

Figure 14:
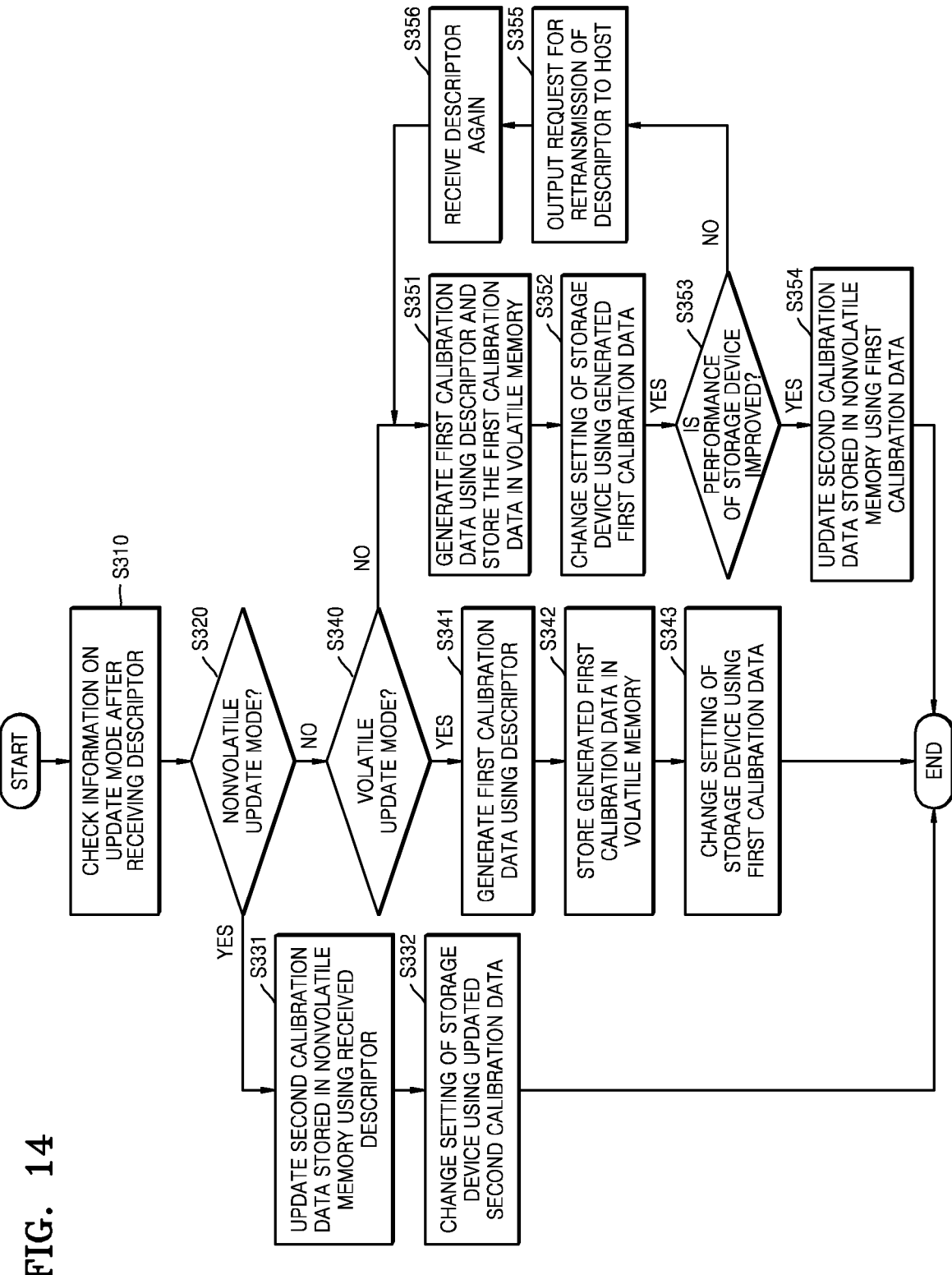
FIG. 14 is a flowchart of an operation method of a calibration manager, according to an exemplary embodiment of the inventive concept.

FIG. 14 is a flowchart of an operation method of the calibration manager 210a, according to an exemplary embodiment of the inventive concept. In more detail, FIG. 14 is a flowchart of an operation method according to an update mode of the calibration manager 210a.

Referring to FIGS. 13 and 14, in operation S310, the calibration manager 210a checks information on the update mode after receiving the descriptor Ds from the host 100a. In operation S320, it is determined whether or not the update mode is a nonvolatile update mode, and when it is determined that the update mode is a nonvolatile update mode, then in operation S331, the calibration manager 210a updates the second calibration data CDat2 stored in the nonvolatile memory 220a using the received descriptor Ds. In operation S332, the calibration manager 210a changes a setting of the storage device 200a using the updated second calibration data CDat2.

In operation S320, when it is determined that the update mode is not a nonvolatile update mode, the calibration manager 210a checks whether the update mode is a volatile update mode. In operation S340, when it is determined that the update mode is a volatile update mode, then in operation S341, the calibration manager 210a generates the first calibration data CDat1 using the descriptor Ds. In operation S342, the calibration manager 210a stores the generated first calibration data CDat1 in the volatile memory 250a, and in operation S343, the calibration manager 210a changes a setting of the storage device 200a using the first calibration data CDat1.

In operation S340, when the update mode is neither a nonvolatile update mode nor a volatile update mode, the update mode is a verification update mode. In operation S351, in a verification update mode, the calibration manager 210a generates the first calibration data CDat1 using the descriptor Ds and stores the first calibration data CDat1 in the volatile memory 250a. In operation S352, the calibration manager 210a changes a setting of the storage device 200a using the generated first calibration data CDat1. Thereafter, in operation S353, the calibration manager 210a determines whether performance of the storage device 200a is improved. In an exemplary embodiment of the inventive concept, the calibration manager 210a checks whether performance of the storage device 200a whose setting has been changed is improved by allowing the changed storage device 200a to perform an event and evaluating the performance. The event may include the host 100a performing one or more read operations and/or write operations with respect to the storage device 200a. The calibration manager 210a may calculate the amount of time it took for the operations of the event to complete as a measure for estimating the performance. For example, if it took a first amount of time to execute the operations of the event before the update, took a second amount of time to execute the operations of the event after the event, and the second amount is less than the first amount, it can be inferred that performance is improved as a result of the update.

If it is determined that the performance is improved, in operation S354, the calibration manager 210a updates the second calibration data CDat2 stored in the nonvolatile memory 220a using the first calibration data CDat1. If it is determined that the performance is not improved, in operation S355, the calibration manager 210a outputs a signal, to the host 100a, requesting retransmission of the descriptor Ds. In operation S356, when the calibration manager 210a receives the descriptor Ds again from the host 100a, operations S351 to S353 are performed again.

Figure 15:
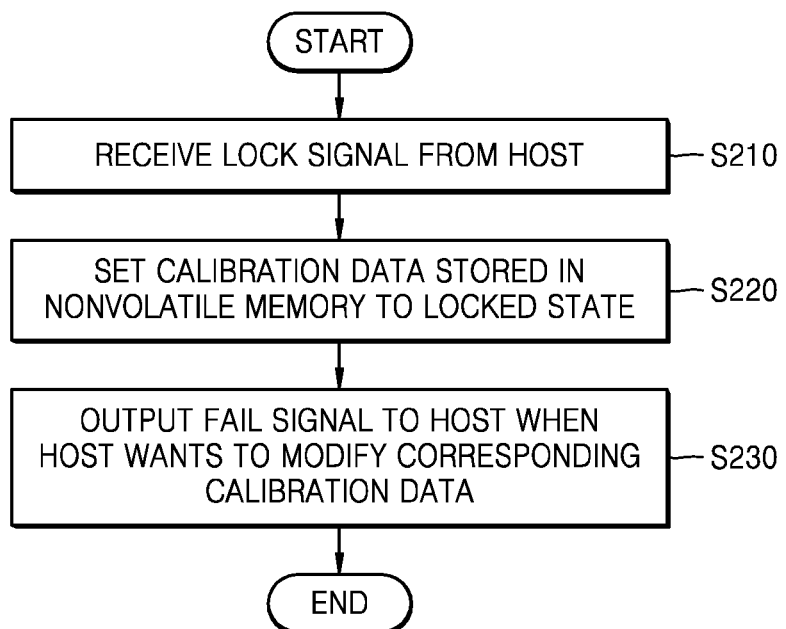
FIG. 15 is a flowchart of an operation method of a calibration manager, according to an exemplary embodiment of the inventive concept.

FIG. 15 is a flowchart of an operation method of the calibration manager 210, according to an exemplary embodiment of the inventive concept.

Referring to FIGS. 2 and 15, the host 100 outputs a lock signal to the calibration manager 210 when it is no longer necessary to update the calibration data CDat. The host 100 may output the lock signal through a new command or transmit the lock signal using the descriptor Ds. In operation S210, when the calibration manager 210 receives the lock signal from the host 100, and then in operation S220, the calibration manager 210 sets the calibration data CDat stored in the nonvolatile memory 220 to a locked state. According to an exemplary embodiment of the inventive concept, in operation S220, the calibration data CDat includes lock state information and the calibration manager 210 sets the calibration data CDat to a locked state by changing the lock state information. According to an exemplary embodiment of the inventive concept, the calibration manager 210 sets the calibration data CDat to a locked state by deleting authentication information of the descriptor Ds of the host 100.

In operation S230, when the host 100 wants to modify corresponding calibration data CDat by an operation such as transmitting the descriptor Ds after the calibration data CDat is set to a locked state, the storage device 200 outputs a fail signal to the host 100. In this case, the fail signal may be indicate to the host 100 that the calibration data CDat is locked.

Figure 16:
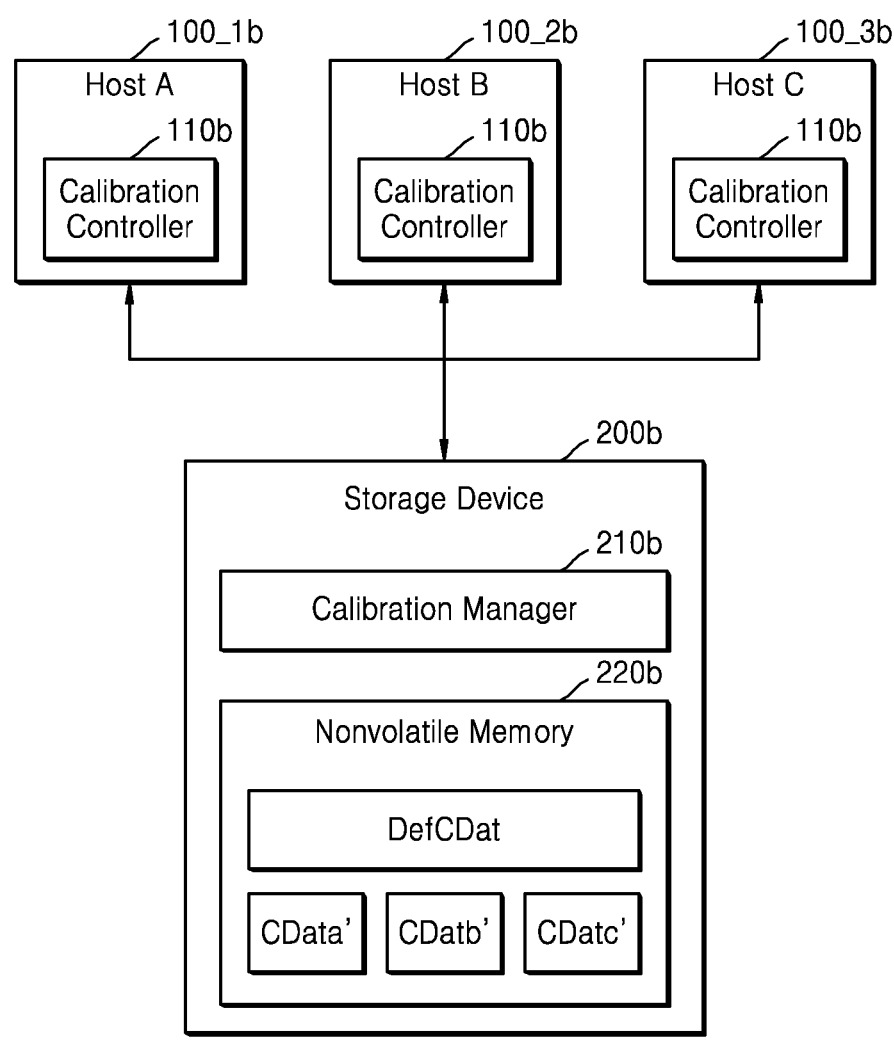
FIG. 16 is a block diagram of a storage system according to an exemplary embodiment of the inventive concept.

FIG. 16 is a block diagram of a storage system 10b according to an exemplary embodiment of the inventive concept. In FIG. 16, the same reference numerals as in FIG. 1 denote the same elements, and therefore, repeated descriptions thereof will not be given herein.

Referring to FIG. 16, the storage system 10b includes a first host 100_1b, a second host 100_2b, a third host 100_3b, and a storage device 200b. Each of the first to third hosts 100_1b to 100_3b includes a calibration controller 110b and the storage device 200b includes a calibration manager 210b and a nonvolatile memory 220b. The nonvolatile memory 220b includes default calibration data DefCDat, first individual calibration data CDatA', second individual calibration data CDatB', and third individual calibration data CDatC'. FIG. 16 is different from FIG. 1 only in that the nonvolatile memory 220b stores the default calibration data DefCDat, the first individual calibration data CDatA', the second individual calibration data CDatB', and the third individual calibration data CDatC' instead of the first calibration data CDatA, the second calibration data CDatB, and the third calibration data CDatC of FIG. 1, and thus, repeated descriptions thereof are omitted.

The default calibration data DefCDat may include setting information common to the first to third hosts 100_1b to 100_3b. For example, the default calibration data DefCDat may be setting information that is compatible with each of the hosts 100_1b to 100_3b. As an example of the inventive concept, the default calibration data DefCDat is a basic setting of the storage device 200b. The first individual calibration data CDatA' may be a setting corresponding to only the first host 100_1b, the second individual calibration data CDatB' may be a setting corresponding to only the second host 100_2b, and the third individual calibration data CDatC' may be a setting corresponding only to the third host 100_3b. That is, the calibration manager 210b may consider a setting of the storage device 200b with respect to the first host 100_1b in combination with the default calibration data DefCDat and the first individual calibration data CDatA'.

Furthermore, when receiving the descriptor Ds from a calibration controller 110b, the calibration manager 210b updates any one of the first individual calibration data CDatA', the second individual calibration data CDatB', and the third individual calibration data CDatC' without updating the default calibration data DefCDat.

Figure 17:
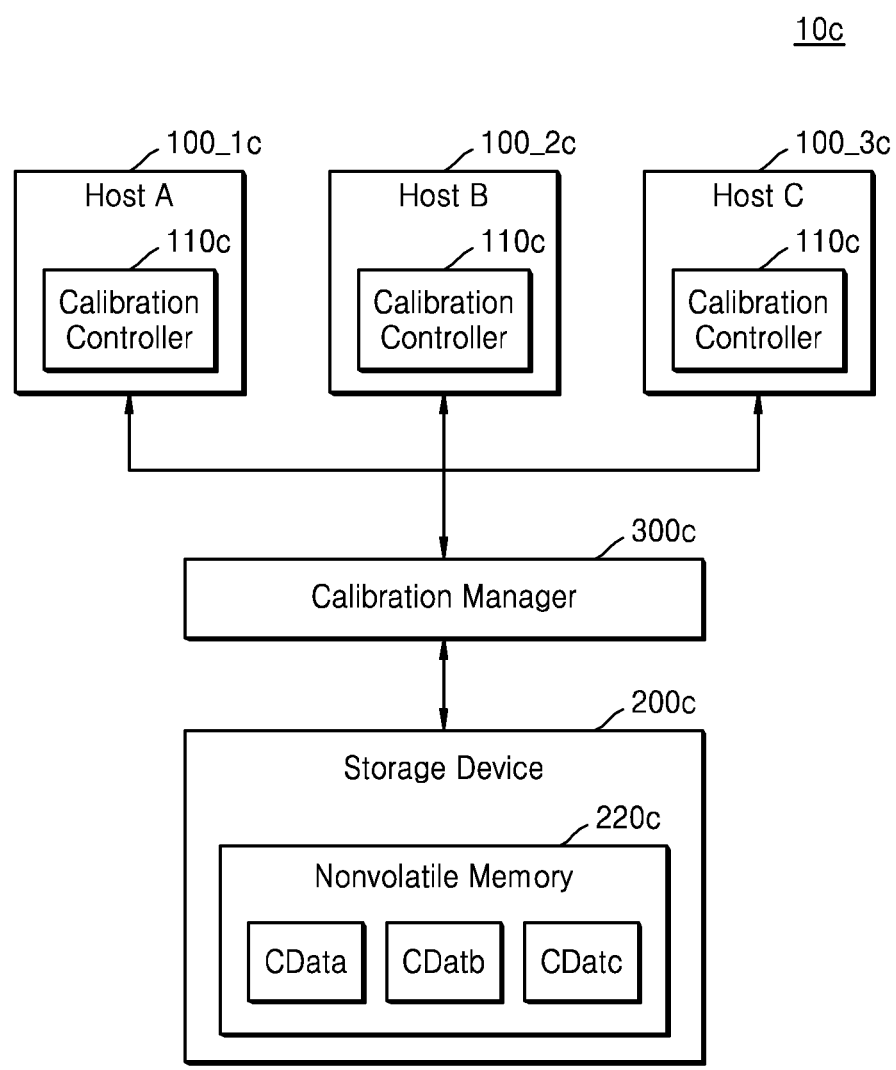
FIG. 17 is a block diagram of a storage system according to an exemplary embodiment of the inventive concept.

FIG. 17 is a block diagram of a storage system 10c according to an exemplary embodiment of the inventive concept. In FIG. 17, the same reference numerals as in FIG. 1 denote the same elements, and therefore, repeated descriptions thereof will not be given herein.

Referring to FIG. 17, the storage system 10c includes a first host 100_1c, a second host 100_2c, a third host 100_3c, a storage device 200c, and a calibration manager 300c. Each of the first to third hosts 100_1 to 100_3c may include a calibration controller 110c, and the storage device 200c includes a nonvolatile memory 220c that stores the first calibration data CDatA, the second calibration data CDatB, and the third calibration data CDatC.

The calibration manager 300c may serve as the calibration manager 210 described above with reference to FIGS. 1 to 16. According to an exemplary embodiment of the inventive concept, the calibration manager 300c may be implemented in hardware as a calibration management chip or in software having a specific algorithm. That is, the calibration manager 300c may update any one of the first calibration data CDatA, the second calibration data CDatB, and the third calibration data CDatC by receiving the descriptor Ds from the calibration controller 110c, and may change a setting of the storage device 200c using the updated calibration data CDatA, CDatB, and CDatC.

Figure 18:
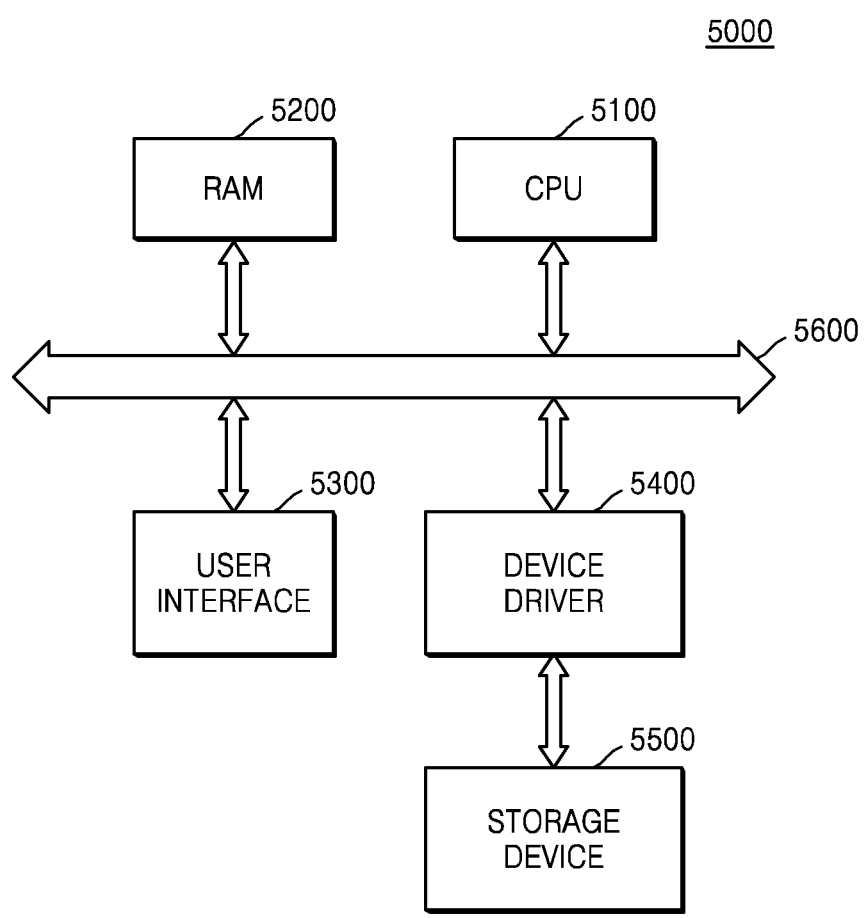
FIG. 18 is a view of a computing system according to an exemplary embodiment of the inventive concept.

FIG. 18 is a view of a computing system 5000 according to an exemplary embodiment of the inventive concept.

The computing system 5000 according to an exemplary embodiment of the inventive concept may be a mobile device or a desktop computer and may include a host 5100 including a CPU, random-access memory (RAM) 5200, a user interface 5300, and a device driver 5400, and each of these may be electrically connected to a bus 5600. A storage device 5500 may be connected to the device driver 5400.

The host 5100 and the storage device 5500 may be the host 100 and the storage device 200 of FIG. 1, respectively. The host 5100 may control the entire computing system 5000 and may perform operations or data processing corresponding to user commands received via the user interface 5300. The RAM 5200 may serve as data memory of the host 5100 and the host 5100 may write or read user data to/from the storage device 5500 via the device driver 5400. Furthermore, FIG. 18 shows that the device driver 5400 for controlling operations and management of the storage device 5500 is provided outside the host 5100. However, in an alternate embodiment, the device driver 5400 is located inside the host 5100.

While the inventive concept has been particularly shown and described with reference to exemplary embodiments thereof, it will be understood that various changes in form and details may be made therein without departing from the spirit and scope of the disclosure.

What is claimed is:

1. A storage device communicably connected to a host, the storage device comprising:
   a volatile memory storing first calibration data for setting the storage device;
   a non-volatile memory storing second calibration data for setting the storage device; and
   a controller configured to receive a descriptor from the host, change the first calibration data using the descriptor when the storage device is in a volatile mode and the descriptor is not encrypted and change the second calibration data using the descriptor when the storage device is in a non-volatile mode and the descriptor is encrypted.

2. The storage device of claim 1, wherein the first calibration data is generated based on the descriptor which is not authenticated by a manufacturer when the storage device is in the volatile mode, and wherein the second calibration data is generated based on the descriptor which is authenticated by the manufacturer, when the storage device is in the non-volatile mode.

3. The storage device of claim 1, wherein the controller changes a setting of the storage device using the first calibration data and determines whether performance of the storage device has improved, when the storage device is in neither of the volatile and non-volatile modes and the storage device is in a verification mode.

4. The storage device of claim 3, wherein the controller performs an event including at least one of a read operation and a write operation, and determines the performance of the storage device based on a result of the performed event.

5. The storage device of claim 3, wherein the controller updates the second calibration data stored in the non-volatile memory using the first calibration data when it is determined that the performance has improved.

6. The storage device of claim 3, wherein the controller outputs a request for retransmission of the descriptor to the host when it is determined that the performance has not improved.

7. The storage device of claim 3, further comprising a device interface enabling the storage device to exchange data and signals with the host, wherein the controller is further configured to change setting information of the device interface based on the first calibration data when the storage device is in the volatile mode and change the setting information based on the second calibration data when the storage device is in the non-volatile mode.

8. The storage device of claim 3, wherein the descriptor includes at least one of identification information indicating the host which is communicably connected to the storage device, mode information indicating one of the volatile mode, non-volatile mode and the verification mode.

* * * * *